United States Patent [19]

Schaefer et al.

[11] 4,144,541
[45] Mar. 13, 1979

[54] LIGHT-ACTIVATED SEMICONDUCTOR DEVICE PACKAGE UNIT

[75] Inventors: Donald L. Schaefer, Schenectady; Victor A. K. Temple, Clifton Park, both of N.Y.

[73] Assignee: Electric Power Research Institute, Inc., Palo Alto, Calif.

[21] Appl. No.: 763,171

[22] Filed: Jan. 27, 1977

[51] Int. Cl.² .................... H01L 27/14; H01L 31/00; H01L 23/02
[52] U.S. Cl. ........................ 357/30; 357/17; 357/74; 357/81
[58] Field of Search ............. 357/17, 18, 19, 30, 357/74, 81

[56] References Cited

U.S. PATENT DOCUMENTS

| | | | |
|---|---|---|---|
| 2,640,901 | 6/1953 | Kinman | 357/30 |
| 3,423,594 | 1/1969 | Galopin | 357/30 |
| 3,532,873 | 10/1970 | Batson et al. | 357/19 |
| 3,585,454 | 6/1971 | Roberts | 357/30 |
| 3,590,344 | 6/1971 | Roberts | 357/30 |
| 3,796,881 | 3/1974 | Roberts | 357/30 |
| 3,840,889 | 10/1974 | O'Brien et al. | 357/18 |
| 3,938,173 | 2/1976 | Jackson et al. | 357/19 |

Primary Examiner—Andrew J. James
Attorney, Agent, or Firm—Townsend and Townsend

[57] ABSTRACT

Optoelectronic devices perform functions under control of light energy striking a light-sensitive area of the device. A flexible light pipe with a connector matching a counterpart at the optoelectronic device guides light energy from a light source to the optoelectronic device, avoiding the requirement for a fixed arrangement of light source and optoelectronic device.

10 Claims, 7 Drawing Figures

LIGHT-ACTIVATED SEMICONDUCTOR DEVICE PACKAGE UNIT

This invention was made under contract with or supported by the Electric Power Research Institute, Inc.

FIELD OF THE INVENTION

The present invention is in the field of optoelectronic semiconductor devices and their packages, especially hermetically sealed packages.

PRIOR ART

Optoelectronic semiconductor devices are electronic devices with light-sensitive elements or areas, which, when exposed to light, visible, infrared, or ultraviolet, will respond in a predetermined manner. The optoelectronic device may change conductivity or assume a different electrical state as defined by its characteristics. Light energy from external sources are directed onto the light-sensitive area through windows, lenses, or guide tubes embedded in the enclosure of the device, whereby devices of the prior art require critical alignment of the light source and the light entrance to the device.

A typical device of prior art is disclosed in U.S. Pat. No. 3,590,344.

OBJECTS OF THE INVENTION

It is an object of this invention to provide for a flexible interface between a light source and an optoelectronic device.

It is an object of this invention to provide for an exchangeable optical interface between a light source and a hermetically sealed optoelectronic device.

It is another object of this invention to provide a guide channel or tube for the optoelectronic device described above, whereby light-carrying means, such as a light pipe, may be inserted and held in the tube to permit light to be conducted to the light-sensitive region of the optoelectronic device.

It is still another object of this invention to simplify implementation of a light gate at the light-sensitive are of the optoelectronic device.

It is still another object of this invention to provide for multiple light gates at the same optoelectronic device.

It is still another object of this invention to provide for an optoelectronic device with multiple light sensors, each of which may be prepared to respond to light energy originating from a different, selectable light source.

SUMMARY OF THE INVENTION

The present invention simplifies mounting of an optoelectronic device by making it independent of its relative position to the light source. In accordance with the present invention the optoelectronic device includes a guide tube which is mounted with one of its ends over the light-sensitive area of the optoelectronic device, while the second end protrudes from the package housing the component. A light pipe or light-guiding fibers are inserted in the guide tube at one end, while the other end is placed close to and in the direction toward the controlling light source. Convenient means is provided, such as a jacket or sleeve, for enclosing the light pipe, such means being stretched over the protruding end of the guide tube to prevent the light pipe from slipping out of the guide tube. The flexible pipe can be bent around corners, or fed through dark, or illuminated, or contaminated areas, to the light source. The connectable light pipe makes the relative position of the light source to the optoelectronic device independent. The diameter and length of the light pipe can be matched with the requirements of the light-sensitive region of the optoelectronic device and the characteristics of the light source.

IN THE DRAWINGS

DESCRIPTION OF THE PREFERRED EMBODIMENT

Figure 1:
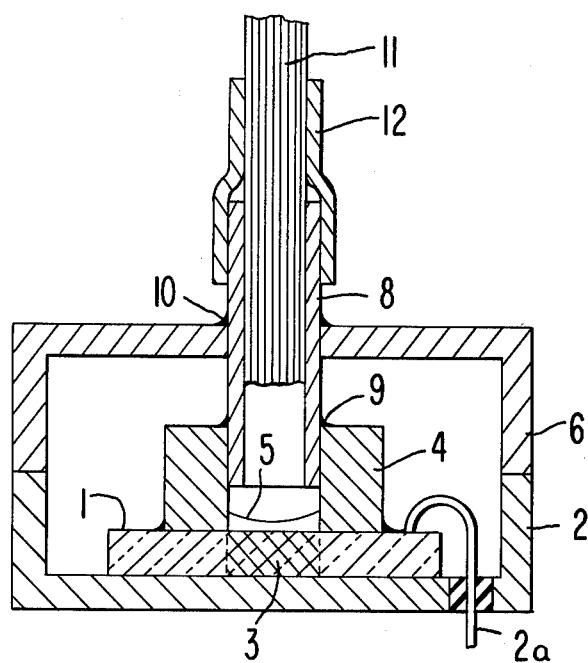
FIG. 1 is a cross section of a hermetically sealed package containing an optoelectronic semiconductor device and having a guide tube and a light pipe in accordance with the present invention.

In FIG. 1 there is shown an arrangement of an optoelectronic semiconductor unit provided with a semiconductor device in a hermetically sealed package with a guide tube interfacing the sealed light-sensitive region of the component with an external light source.

The optoelectronic device 1 is affixed to and makes electrical contact with a main body 2 of the hermetically sealed package. An electrical lead also makes electrical contact with device 1 on the inner flat face thereof. Lead 2a extends through a hole 2b containing an insulation material. A locating fixture 4 is placed over light-sensitive region 3 and is attached to device 1 by a light-transparent sealant 5 which covers light-sensitive region 3 against contamination and holds fixture 4 in the proper position. Sealant 5 is transparent to light over a suitable wavelength range, e.g., 5000 to 12000 Angstroms for silicon optoelectronic devices.

Package cover 6 includes an opening through which guide tube 8 protrudes. Cover 6 and guide tube 8 are placed over main body 2 in such a manner that main body 2 and package cover 6 form a hermetically sealed package. One open end of guide tube 8 is placed in fixture 4 in spaced relationship to device 1, with sealant 9 between guide tube 8 and fixture 4, and sealant 10 between guide tube 8 and package cover 6 in the area of the opening through which guide tube 8 protrudes, to complete the hermetical seal around optoelectronic device 1.

Figure 3A:
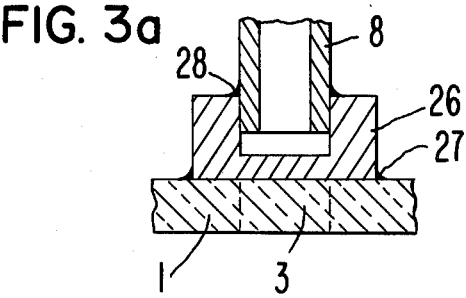
FIGS. 3a and 3b are illustrations of different combinations of guide tube and semiconductor device interfaces.
Figure 3B:
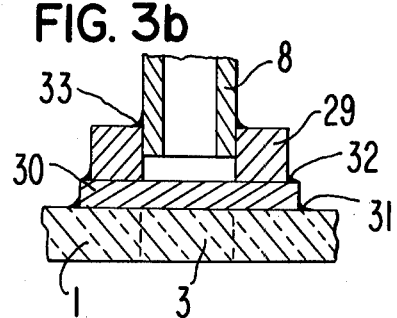

Various combinations of guide tube 8, fixture 4 and device 1 are shown in FIGS. 3a and 3b.

A light pipe 11 is inserted in the other open end of guide tube 8, guiding light energy from a distant light source onto light-sensitive region 3. A resilient sleeve 12 is stretched over the other end of guide tube 8 and covers the part of light pipe 11 which enters guide tube 8. Sleeve 12 prevents unintended separation of light pipe 11 from guide tube 8. Sleeve 12 may be made of shrinkable tubing or an elastic material. It may enclose light pipe 11 over its total length.

Figure 2:
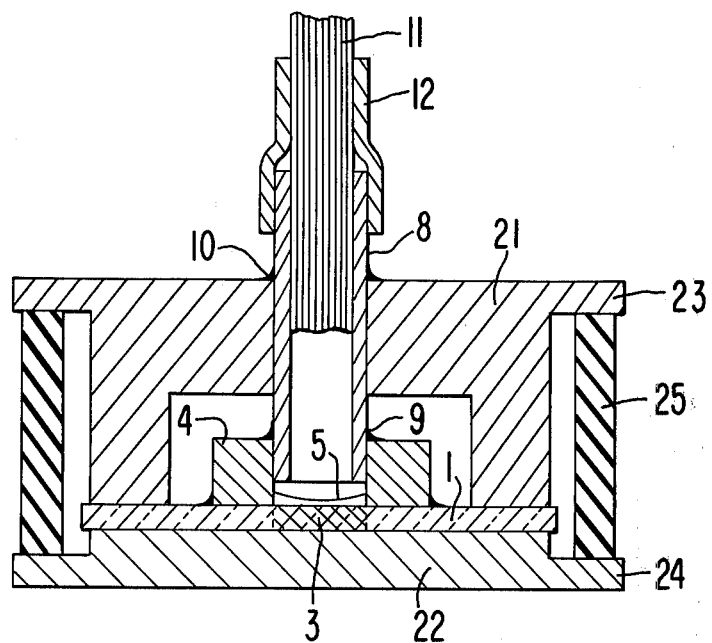
FIG. 2 is a cross section of a hermetically sealed package containing a high-power optoelectronic semiconductor device and having a guide tube and a light pipe.

An illustration of a different arrangement of an optoelectronic semiconductor unit with an optical control interface is shown in FIG. 2. Semiconductor device 1 is held between two preferably circular electrodes 21 and 22, electrode 21 being a top cover and electrode 22 being a bottom cover. Electrode 21 has a flange 23; electrode 22 has a flange 24. Flanges 23 and 24 are separated by a circular insulating ring 25. Electrode 21 has an opening through which guide tube 8 provides an optical access to light-sensitive region 3. Guide tube 8 is held in locating fixture 4 over light-sensitive region 3 of the semiconductor device 1.

The arrangement of which FIG. 2 is an illustration provides for large areas of electrodes 21 and 22. This is a special requirement if the semiconductor device 1 is an optically controlled power transistor or thyristor. Insulating ring 25 provides for high voltage insulation between the two electrodes.

Figure 2A:
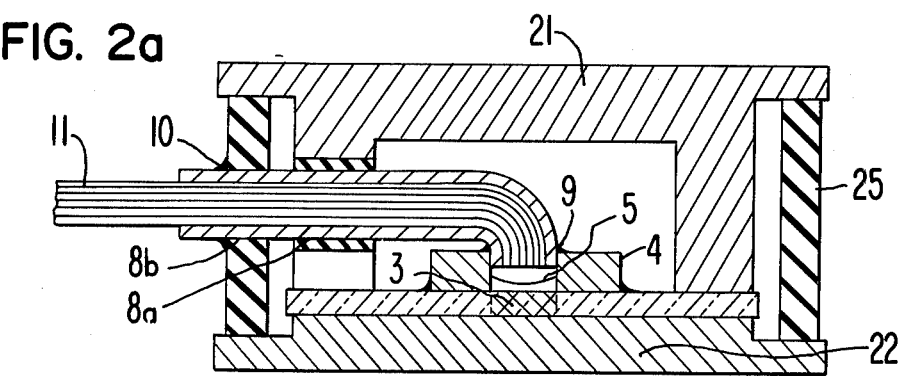
FIG. 2a is a view similar to FIG. 2 but showing a modification thereof.

FIG. 2a shows a unit similar to FIG. 2 except that guide tube 8 is bent and extends through aligned openings 8a and 8b in electrode 21 and insulating ring 25, respectively. Sealant 10 assures that the inner end of guide tube 8 is hermetically sealed over the light-sensitive area of semiconductor device 1. Light pipe 11 is inserted into guide tube 8 as described above.

FIGS. 3a and 3b are illustrations of two different methods of affixing guide tube 8 over light-sensitive region 3.

In FIG. 3a, a fixture 26 made from light-transparent material includes a cavity into which guide tube 8 is placed. Fixture 26 is held in place by sealant 27. Guide tube 8 is held in fixture 26 by sealant 28. Sealant 28 protects the interior of the package from contamination through guide tube 8.

FIG. 3b is an illustration of another implementation of a sealed optical interface. A transparent plate 30 separates fixture 29 from component 3. Plate 30, fixture 29 and guide tube 8 are held in position over light-sensitive region 3 of device 1 by sealants 31, 32 and 33.

All the interfaces described above have a guide tube 8, of which the end closest to the light-sensitive area 3 is closed by light-transparent material. The other end is open and serves as receptacle for light pipe 11.

Figure 4:
FIG. 4 is an illustration showing a light pipe interfacing an optoelectronic device with a light source.

In FIG. 4 there is shown a hermetically sealed optoelectronic device 40 with a protruding guide tube 41, an attached light pipe 42 and a light source 44. Light pipe 42 consists of one or more light-guiding fibers which are inserted in guide tube 41 and held in place by sleeve 45.

Light source 44 is represented in FIG. 4 by a light-emitting diode. Other types and/or sizes of light sources, as well as additional means, such as lenses and mirrors, may be used to interface between light source and light pipe without departing from the spirit or essential characteristics of this invention.

The maximum length of light pipe 42 is only limited by the intensity of light source 44, the losses of light energy in light pipe 42 and the light energy required at the light-sensitive region 3 to perform the desired function.

As indicated on FIG. 4, light pipe 42 can be bent as necessary to guide light energy from light source 44 to device 40. There is no need to align device 40 relative to light source 44. Light pipe 42 can be manufactured to suit the particular requirements of an application, limited only by the conditions mentioned above. The exchangeability of light pipe 42 makes device 40 independent of light source 44 and any changes in the location of light source 44 relative to device 40.

Figure 5:
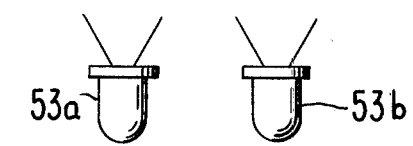
FIG. 5 is an illustration of an optoelectronic device with two optical interfaces.

Because light-guiding fibers can be manufactured with small diameters (3 mils) and the light-sensitive regions of optoelectronic components can be manufactured to the same size, one optoelectronic component may have more than one of such optical interfaces. FIG. 5 is an illustration of an optoelectronic device 50 with two optical interfaces consisting of guide tubes 51a and 51b and light pipes 52a and 52b. Device 50 can perform functions under control of two independent light sources 53a and 53b.

It is understood that the invention is not limited to the specific types of packages shown and described herein, as various other packages as well as other modifications of the arrangement may be made without departing from the scope of the appended claims.

We claim:

1. An optoelectronic semiconductor unit comprising, in combination: a semiconductor device having a light-sensitive area; a guide tube having a pair of open ends; a locating fixture mounted on the device and extending outwardly therefrom, said locating fixture having a hole at its outer extremity in alignment with said area, one end of the tube being received in the hole and being in spaced relationship to said area, there being means for sealing the junction between the tube and the fixture; a light pipe removably insertable into the other end of said guide tube for conducting light energy onto said light-sensitive area; and a sealed package, said device and said locating fixture being wholly disposed in the package and said guide tube extending from the locating fixture and through and outwardly of the package, said package being operable for hermetically enclosing said semiconductor device and said one end of said guide tube.

2. An optoelectronic semiconductor unit as set forth in claim 1, wherein said light pipe comprises a plurality of flexible light-guiding fibers.

3. An optoelectronic semiconductor unit as set forth in claim 1, and including an electrical lead in electrical contact with said device at a location spaced laterally from the locating fixture, said lead extending through and being electrically isolated from said package.

4. An optoelectronic semiconductor unit as set forth in claim 1, including means sealing the junction between the device and the fixture.

5. An optoelectronic semiconductor unit as set forth in claim 1, and including a light-transparent sealant within the hole and in covering relationship to said light-sensitive area.

6. An optoelectronic semiconductor unit as set forth in claim 1, wherein said fixture is formed from a light-transparent material and engages said device, said hole being in the fixture terminating at a location within the fixture.

7. An optoelectronic semiconductor unit as set forth in claim 1, wherein is included a light-transparent plate between the fixture and the device, said recess including a hole through the fixture in alignment with said light-sensitive area.

8. An optoelectronic semiconductor unit comprising, in combination: an enclosure including a top cover member having a first flange, a bottom cover member spaced from the top cover member and having a second flange, and an insulator member between said first and second flanges, one of said members having an opening therethrough, said top cover defining a first electrode having a first contact area, said bottom cover defining a second electrode having a second contact area; an optoelectronic semiconductor device having a photosensitive region and disposed between and in electrical contact with said first and second contact areas; and optical interface means, including a guide tube having a pair of open ends and extending through said opening, a locating fixture wholly disposed within the enclosure and having a hole aligned with said photosensitive region, one end of the guide tube being in the hole and spaced from said region, the guide tube being hermetically sealed to the fixture over said photosensitive region, said guide tube adapted to receive a light-guiding pipe for directing light energy onto said region.

9. An optoelectronic semiconductor unit as set forth in claim 8, wherein said opening is in said top cover member.

10. An optoelectronic semiconductor unit as set forth in claim 8, wherein said opening is in said insulator member.

* * * * *